United States Patent
Chen et al.

(10) Patent No.: US 12,341,343 B2
(45) Date of Patent: Jun. 24, 2025

(54) CONTROL METHOD FOR ENERGY STORAGE SYSTEM AND APPARATUS, ENERGY STORAGE SYSTEM, AND ENERGY STORAGE DEVICE

(71) Applicant: Gree Electric Appliances, Inc. of Zhuhai, Guangdong (CN)

(72) Inventors: Ningning Chen, Guangdong (CN); Shan Zhang, Guangdong (CN); Jing Wang, Guangdong (CN); Meng Huang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 18/567,954

(22) PCT Filed: May 9, 2022

(86) PCT No.: PCT/CN2022/091645
§ 371 (c)(1),
(2) Date: Dec. 7, 2023

(87) PCT Pub. No.: WO2023/029552
PCT Pub. Date: Mar. 9, 2023

(65) Prior Publication Data
US 2024/0275169 A1    Aug. 15, 2024

(30) Foreign Application Priority Data
Sep. 6, 2021   (CN) .......................... 202111052847.0

(51) Int. Cl.
*H02J 3/32*    (2006.01)
*H02J 3/00*    (2006.01)
*H02J 7/00*    (2006.01)

(52) U.S. Cl.
CPC .............. *H02J 3/32* (2013.01); *H02J 3/0012* (2020.01); *H02J 7/0048* (2020.01); *H02J 7/00712* (2020.01); *H02J 2203/10* (2020.01)

(58) Field of Classification Search
CPC .......... H02J 3/32; H02J 7/0048; H02J 3/0012; H02J 7/00712; H02J 2203/10
See application file for complete search history.

(56) References Cited

U.S. PATENT DOCUMENTS

| | | | |
|---|---|---|---|
| 2012/0043821 A1 | 2/2012 | Lee et al. | |
| 2014/0152097 A1* | 6/2014 | Kitaji | H02J 1/10 307/19 |

(Continued)

FOREIGN PATENT DOCUMENTS

| | | |
|---|---|---|
| AU | 2022337487 A1 | 12/2023 |
| CN | 105109358 A | 12/2015 |

(Continued)

OTHER PUBLICATIONS

EP 22862695.8, Extended European Search Report, Nov. 25, 2024.

(Continued)

*Primary Examiner* — Carlos Amaya
(74) *Attorney, Agent, or Firm* — The Webb Law Firm (57) ABSTRACT

The present disclosure discloses a control method for an energy storage system and apparatus, an energy storage system, and an energy storage device. The control method includes obtaining an operation parameter of a power grid and an electric quantity state of an energy storage battery in an energy storage system; and controlling working states of the power grid, the energy storage battery, a first auxiliary power supply, and a second auxiliary power supply according to the operation parameter of the power grid and the electric quantity state of the energy storage battery.

10 Claims, 4 Drawing Sheets

(56) References Cited

U.S. PATENT DOCUMENTS

2019/0081479 A1\* 3/2019 Faley ............... H02J 13/00001
2021/0218249 A1\* 7/2021 Dong ..................... B60L 53/52
2023/0283082 A1 9/2023 Li et al.

FOREIGN PATENT DOCUMENTS

| CN | 106712090 A | 5/2017 |
| CN | 209448499 U | 9/2019 |
| CN | 111463877 A | 7/2020 |
| CN | 112737086 A | 4/2021 |
| CN | 112821435 A | 5/2021 |
| CN | 113922440 A | 1/2022 |

OTHER PUBLICATIONS

Satapathy, Prachitara et al., "Performance validation of battery management system under prediction error for photovoltaic based distribution system", IET Renew. Power Gener., 2018, pp. 702-717, vol. 12, No. 6.

\* cited by examiner

Fig. 1

Obtain an operation parameter of a power grid and an electric quantity state of an energy storage battery in the energy storage system Control working states of the power grid, the energy storage battery, a first auxiliary power supply and a second auxiliary power supply according to the operation parameter of the power grid and the electric quantity state of the energy storage battery

CONTROL METHOD FOR ENERGY STORAGE SYSTEM AND APPARATUS, ENERGY STORAGE SYSTEM, AND ENERGY STORAGE DEVICE

CROSS-REFERENCE TO RELATED APPLICATIONS

This application is United States national phase of International Patent Application No. PCT/CN2022/091645, filed May 9, 2022, and claims priority to Chinese Patent Application No. 202111052847.0, filed Sep. 6, 2021, the disclosures of which are hereby incorporated by reference in their entireties.

BACKGROUND OF THE INVENTION

Field of the Invention

The present disclosure relates to a control method and apparatus for an energy storage system, an energy storage system and an energy storage device.

Description of Related Art

Figure 1:
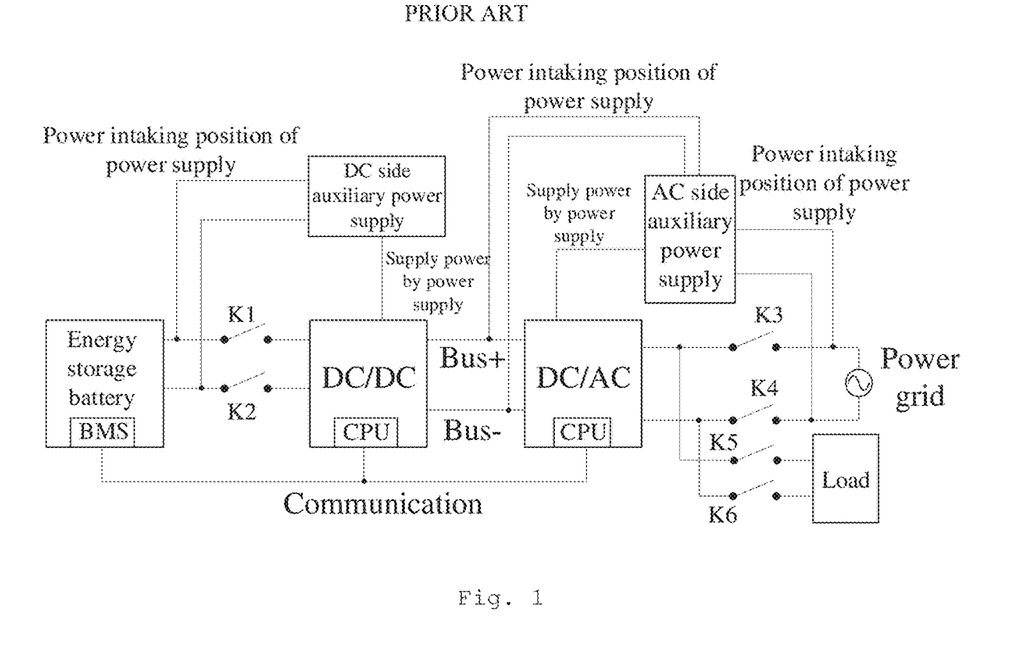
FIG. 1 is a schematic view of intaking power by an auxiliary power supply of an energy storage system in the prior art.

A solution of an energy storage system in the prior art is shown in FIG. 1. A DC side auxiliary power supply intakes power from an energy storage battery side to supply power to a battery management system (BMS) and a charge-discharge controller (bidirectional DC/DC), and an AC side auxiliary power supply intakes power from an AC side and a DC bus side.

SUMMARY OF THE INVENTION

In a first aspect, a control method of an energy storage system is provided. The method comprises: obtaining an operation parameter of a power grid and an electric quantity state of an energy storage battery in the energy storage system; and controlling working states of the power grid, the energy storage battery, a first auxiliary power supply and a second auxiliary power supply according to the operation parameter of the power grid and the electric quantity state of the energy storage battery.

In a second aspect, the present disclosure provides a control apparatus for an energy storage system, comprising: a data obtaining module configured to obtain an operation parameter of a power grid and an electric quantity state of an energy storage battery in the energy storage system; and a device control module configured to control working states of the power grid, the energy storage battery, a first auxiliary power supply and a second auxiliary power supply according to the operation parameter of the power grid and the electric quantity state of the energy storage battery.

In a third aspect, the present disclosure provides an energy storage system, comprising: an energy storage battery, a charge-discharge controller, a grid on-off controller, a power grid, a load, a first auxiliary power supply, a second auxiliary power supply and the control apparatus described in the above-described technical solution; wherein the energy storage battery is connected to the charge-discharge controller and the grid on-off controller sequentially; the grid on-off controller is connected to the power grid and the load; the first auxiliary power supply is connected to the power grid, the charge-discharge controller and the grid on-off controller; and the second auxiliary power supply is connected to the energy storage battery, the charge-discharge controller and the grid on-off controller.

In a fourth aspect, the present disclosure provides an energy storage device, comprising the energy storage system described in the above-described technical solution.

BRIEF DESCRIPTION OF THE DRAWINGS

In order to more explicitly explain the technical solutions in the embodiments of the present disclosure or the related art, a brief introduction will be given below for the accompanying drawings required to be used in the description of the embodiments or the related art. It is obvious that, the accompanying drawings illustrated below are merely some of the embodiments of the present disclosure. For those of ordinary skill in the art, other accompanying drawings may also be obtained according to such accompanying drawings on the premise that no inventive effort is involved.

DESCRIPTION OF THE INVENTION

In order to make the purpose, technical solution and advantages of the present disclosure more explicit, the technical solution of the present disclosure will be described in detail below with the accompanying drawings in conjunction and embodiments. Obviously, the embodiments described are only some embodiments of the present disclosure, not all of the embodiments. Based on the embodiments of the present disclosure, all other embodiments obtained by those of ordinary skills in the art on the premise that no inventive effort is involved pertain to the protection scope of the present disclosure.

The inventors of the present disclosure have found that, in the prior art, when a power grid is cut off and the electric quantity of the energy storage battery is low and the energy storage battery supplies power to the load, the DC side auxiliary power supply will also consume the stored energy; or when the system remains unused in standby, the DC side auxiliary power supply will also consume the electric quantity of the energy storage battery likewise. If charging is not performed in time, it is possible to lead to over-discharge of the energy storage battery, which will make the system unable to restart, and also affect the service life of the energy storage battery and customer experience and increase the after-sales maintenance cost.

In view of this, the present disclosure provides a control method for an energy storage system.

It is to be noted that, the charge-discharge controller mentioned in the embodiments of the present disclosure is a bidirectional DC/DC controller with CPU, the grid on-off controller is a DC/AC controller with CPU, and the energy storage battery is provided with a battery management system BMS, wherein the DC/AC controller may not only convert a direct current into an alternating current, but also convert the alternating current into the direct current.

Figure 2:
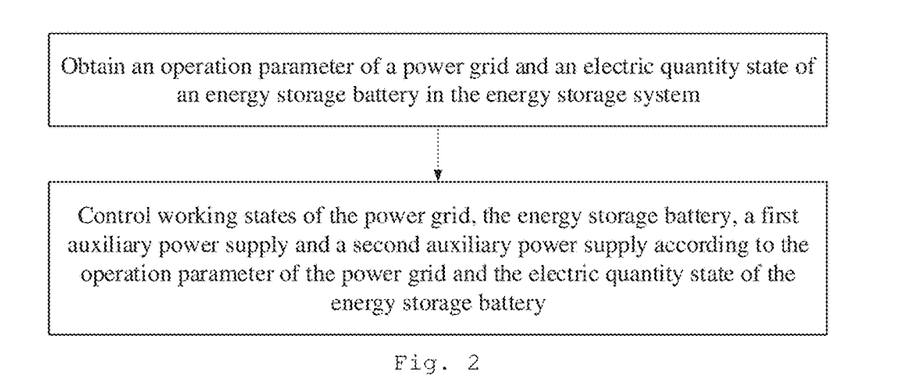
FIG. 2 is a flowchart of a control method for an energy storage system provided by some embodiments of the present disclosure.

Referring to FIG. 2, the embodiments of the present disclosure provides a control method for an energy storage system, wherein the control method comprising: obtaining an operation parameter of a power grid and an electric quantity state of an energy storage battery in the energy storage system; and controlling working states of the power grid, the energy storage battery, a first auxiliary power supply and a second auxiliary power supply according to the operation parameter of the power grid and the electric quantity state of the energy storage battery.

In the control method for an energy storage system provided by the embodiments of the present disclosure, first of all, the operation parameter of the power grid and the electric quantity state of the energy storage battery in the energy storage system are obtained; and then, the working states of the power grid, the energy storage battery, the first auxiliary power supply and the second auxiliary power supply are controlled according to the operation parameter of the power grid and the electric quantity state of the energy storage battery. In the solution of the present disclosure, the operation parameter of the power grid and the electric quantity state of the energy storage battery are considered during the control, so that it is possible to avoid the situation of over-discharge of the battery due to supplying power still to the load when the power grid is cut off and the electric quantity of the energy storage battery is low. By considering the operation parameter of the power grid and the electric quantity state of the energy storage battery, the service life of the energy storage battery can be prolonged, and the user experience can be ensured. It is to be noted that, the control method for the energy storage system may be performed by a control apparatus for the energy storage system, a control chip in the energy storage system, or a processor not comprised in a computer device.

In some embodiments of the present disclosure, the operation parameter of the power grid comprises: a current, a voltage and frequency information of the power grid. The electric quantity state of the energy storage battery comprises a state of sufficient electric quantity and a state of insufficient electric quantity. When the electric quantity of the energy storage battery is sufficient, the energy storage battery satisfies a discharge condition. When the electric quantity of the energy storage battery is insufficient, the energy storage battery does not satisfy the discharge condition.

Figure 3:
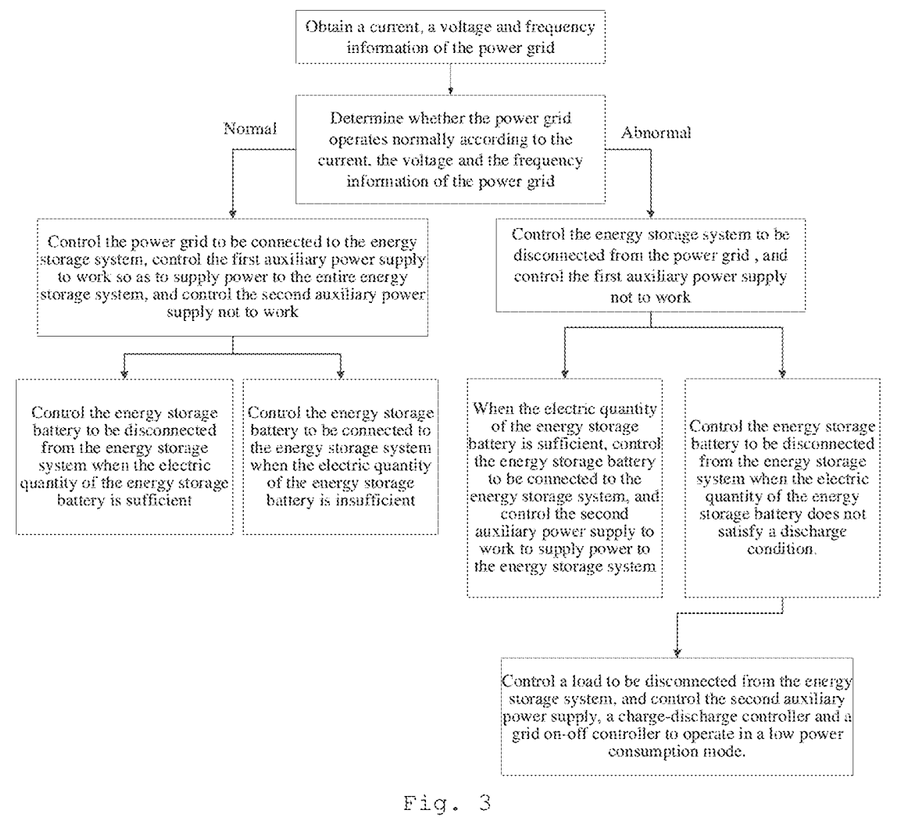
FIG. 3 is a flowchart of a control method for an energy storage system provided by other embodiments of the present disclosure.

In some embodiments of the present disclosure, as shown in FIG. 3, in the control method for an energy storage system according to the embodiments of the present disclosure, the controlling of the working states of the power grid, the energy storage battery, the first auxiliary power supply and the second auxiliary power supply according to the operation parameter of the power grid and the electric quantity state of the energy storage battery comprises the following step.

Whether the power grid operates normally is determined according to the current, the voltage and the frequency information of the power grid.

When the power grid operates normally, the power grid is controlled to be connected to the energy storage system, the first auxiliary power supply is controlled to work, and the second auxiliary power supply is controlled not to work, and whether an electric quantity of the energy storage battery is sufficient is determined according to the electric quantity state of the energy storage battery.

In the embodiments, whether the power grid operates normally is determined according to the obtained current, voltage and frequency information of the power grid. When the power grid operates normally, the power grid is controlled to be connected to the energy storage system so as to supply power to the load; the first auxiliary power supply is controlled to work so as to supply power to the entire energy storage system, and the second auxiliary power supply is controlled not to work; and the working state of the energy storage battery is further controlled according to the electric quantity condition.

In some embodiments of the present disclosure, when the power grid operates normally, the control method for the energy storage system further comprises: controlling the energy storage battery to be disconnected from the energy storage system when the electric quantity of the energy storage battery is sufficient; and controlling the energy storage battery to be connected to the energy storage system when the electric quantity of the energy storage battery is insufficient.

In the embodiments, when the electric quantity of the energy storage battery is sufficient, there is no need to charge the energy storage battery at this time, and the energy storage battery is controlled to be disconnected from the energy storage system. When the electric quantity of the energy storage battery is insufficient, the energy storage battery is controlled to be connected to the energy storage system, so that the energy storage system charges the energy storage battery.

In some embodiments of the present disclosure, the control method for the energy storage system further comprises: when the power grid operates abnormally, controlling the power grid to be disconnected from the energy storage system, controlling the first auxiliary power supply not to work, and determining, according to the electric quantity state of the energy storage battery, whether an electric quantity of the energy storage battery is sufficient.

When the power grid is abnormal, the energy storage system is controlled to be disconnected from the power grid. Since the first auxiliary power supply is provided to intake power from the power grid, the first auxiliary power supply is controlled not to work at this time, and whether the electric quantity of the energy storage battery is sufficient is further determined according to the electric quantity state of the energy storage battery.

In some embodiments of the present disclosure, when the power grid operates abnormally, the control method for the energy storage system further comprises: when the electric quantity of the energy storage battery is sufficient, controlling the energy storage battery to be connected to the energy storage system, and controlling the second auxiliary power supply to work; and controlling the energy storage battery to be disconnected from the energy storage system when the electric quantity of the energy storage battery does not satisfy a discharge condition.

In the embodiments, when the electric quantity of the energy storage battery is sufficient, the energy storage battery is controlled to be connected to the energy storage system so that the energy storage battery supplies power to the load, and the second auxiliary power supply is controlled to work so as to supply power to the energy storage system. When the electric quantity of the energy storage battery does not satisfy the discharge condition, the energy storage battery is controlled to be disconnected from the energy storage system, the load is controlled to be disconnected from the energy storage system, and the second auxiliary power supply, the charge-discharge controller and the grid on-off controller are controlled to operate in a low power consumption mode. In this way, there will not be the situation of over-discharge of the battery due to supplying power still to the load when the power grid is cut off and the electric quantity of the energy storage battery is low. By considering the operation parameter of the power grid and the electric quantity state of the energy storage battery, the service life of the energy storage battery can be prolonged, and the user experience can be ensured.

It is to be noted that, the energy storage battery does not satisfy the discharge condition, which means that it is possible to lead to over-discharge of the energy storage battery if the current energy storage battery continues to discharge.

In the specific control method for the energy storage system provided by the embodiments of the present disclosure, working of the first auxiliary power supply or working of the second auxiliary power supply or the low power consumption mode is selected according to the working state of the energy storage system, so as to minimize the discharge amount of the energy storage battery when not in use, prolong its service time and avoid over-discharge, thereby reducing the after-sales maintenance cost and improving the client experience.

Figure 4:
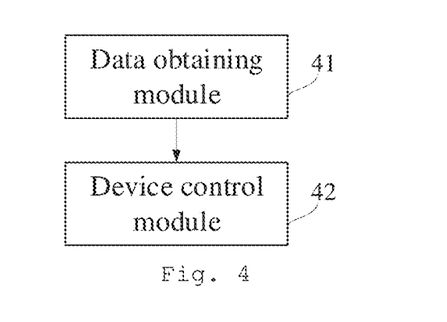
FIG. 4 is a structural view of a control apparatus for an energy storage system provided by some embodiments of the present disclosure.

In some embodiments of the present disclosure, as shown in FIG. 4, a control apparatus for an energy storage system is also provided. The control apparatus comprises a data obtaining module 41 and a device control module 42.

The data obtaining module 41 is configured to obtain an operation parameter of a power grid and an electric quantity state of an energy storage battery in the energy storage system. The obtained operation parameter of the power grid in the energy storage system comprise: a obtained current, a voltage and frequency information of the power grid. Whether the power grid is abnormal is determined according to the current, voltage and frequency information.

The device control module 42 is configured to control working states of the power grid, the energy storage battery, a first auxiliary power supply and a second auxiliary power supply according to the operation parameter of the power grid and the electric quantity state of the energy storage battery. Specifically, whether the power grid operates normally is determined according to the current, the voltage and the frequency information of the power grid. When the power grid operates normally, the power grid is controlled to be connected to the energy storage system, the first auxiliary power supply is controlled to work, the second auxiliary power supply is controlled not to work, and whether an electric quantity of the energy storage battery is sufficient is determined according to the electric quantity state of the energy storage battery. When the electric quantity of the energy storage battery is sufficient, the energy storage battery is controlled to be disconnected from the energy storage system; when the electric quantity of the energy storage battery is insufficient, the energy storage battery is controlled to be connected to the energy storage system, so that the energy storage system charges the energy storage battery.

When the power grid operates abnormally, the power grid is controlled to be disconnected from the energy storage system, and the first auxiliary power supply is controlled not to work, and whether the electric quantity of the energy storage battery is sufficient is determined according to the electric quantity state of the energy storage battery. When the electric quantity of the energy storage battery is sufficient, the energy storage battery is controlled to be connected to the energy storage system, so that the energy storage battery supplies power to the load and the second auxiliary power supply is controlled to work. When the electric quantity of the energy storage battery does not satisfy the discharge condition, the energy storage battery is controlled to be disconnected from the energy storage system. When the electric quantity of the energy storage battery does not satisfy the discharge condition, the load is controlled to be disconnected from the energy storage system, and the second auxiliary power supply, a charge-discharge controller and a grid on-off controller are controlled to operate in a low power consumption mode.

In the control apparatus for an energy storage system provided by the embodiments of the present disclosure, working of the first auxiliary power supply or working of the second auxiliary power supply or the low power consumption mode is selected according to the working state of the energy storage system, so as to minimize the discharge amount of the energy storage battery when not in use, prolong its service time, and avoid over-discharge, thereby reducing the after-sales maintenance cost and improving the client experience.

Figure 5:
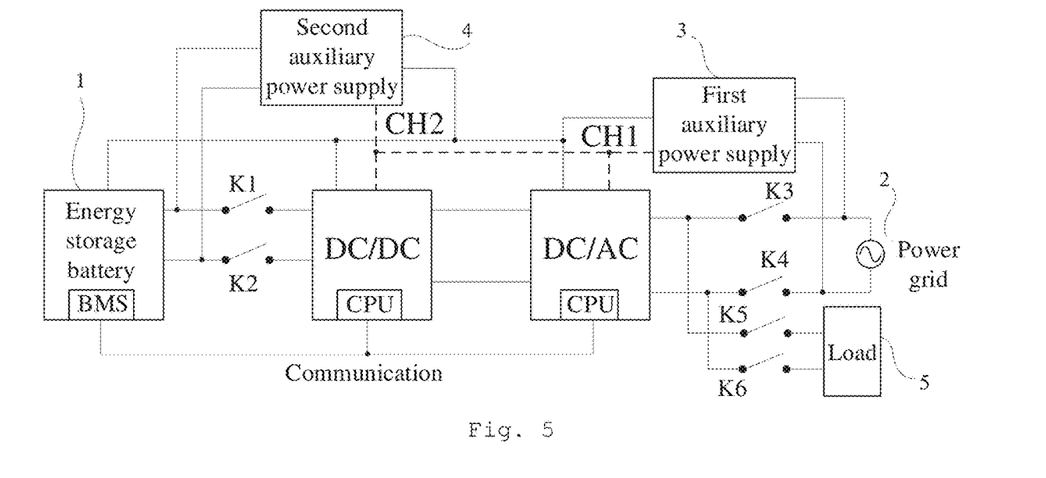
FIG. 5 is a schematic structural view of an energy storage system provided by some embodiments of the present disclosure.

In some embodiments, as shown in FIG. 5, the present disclosure also provides an energy storage system, the energy storage system comprising: an energy storage battery 1, a charge-discharge controller DC/DC, a grid on-off controller DC/AC, a power grid 2, a load 5, a first auxiliary power supply 3, a second auxiliary power supply 4, and a control apparatus for an energy storage system provided in the above-described embodiments of the application.

The energy storage battery 1 is connected to the charge-discharge controller DC/DC and the grid on-off controller DC/AC sequentially.

The grid on-off controller DC/AC is connected to the power grid 2 and the load 5 respectively.

The first auxiliary power supply 3 is connected to the power grid 2, the charge-discharge controller DC/DC and the grid on-off controller DC/AC respectively.

The second auxiliary power supply 4 is connected to the energy storage battery 1, the charge-discharge controller DC/DC and the grid on-off controller DC/AC respectively.

In some embodiments, as shown in FIG. 5, the energy storage system comprises an energy storage battery (with a battery management system BMS), a charge-discharge controller (bidirectional DC/DC), a grid on-off controller (DC/AC), alternating current relays K3, K4, K5, K6, direct current contactors K1, K2, a first auxiliary power supply, a second auxiliary power supply, a power grid and a load. The direct current contactors K1 and K2 are connected between the energy storage battery and the charge-discharge controller DC/DC, the alternating current relays K3 and K4 are connected between the grid on-off controller DC/AC and the power grid, and the alternating current relays K5 and K6 are connected between the grid on-off controller DC/AC and the load. The first auxiliary power supply intakes power from the alternating current power grid and outputs the power to BMS of the energy storage battery, the charge-discharge controller DC/DC and the grid on-off controller DC/AC. The second auxiliary power supply intakes power from the energy storage battery side and outputs the power to the BMS of the energy storage battery, the charge-discharge controller DC/DC and the grid on-off controller DC/AC. The charge-discharge controller DC/DC may output controller signals CH1 and CH2 to control whether the first auxiliary power supply and the second auxiliary power supply work. Similarly, the controller signals CH1 and CH2 may also be output by the grid on-off controller DC/AC, and one of them may be selected in practical application.

The specific working process is as follows:

Working modes of the energy storage system may be divided into four working modes. In a first working mode, the power grid supplies power to the load, and the relays K3, K4, K5 and K6 are closed. In a second working mode, the power grid supplies power to the load and charges the energy storage battery at the same time, and at this time, the relays K3, K4, K5 and K6 and the contactors K1 and K2 are all closed. In a third working mode, the power grid is abnormal, the energy of the energy storage battery satisfies a discharge condition, and the energy storage battery supplies power to the load, and the relays K5 and K6 are closed, the contactors K1 and K2 are closed, and the relays K3 and K4 are open. In a fourth working mode, the power grid is abnormal, the energy of the energy storage battery does not satisfy the discharge condition, and the charge-discharge controller and the grid on-off controller work in the low power consumption mode, and the relays K3, K4, K5 and K6 and the contactors K1 and K2 are all open.

Figure 6:
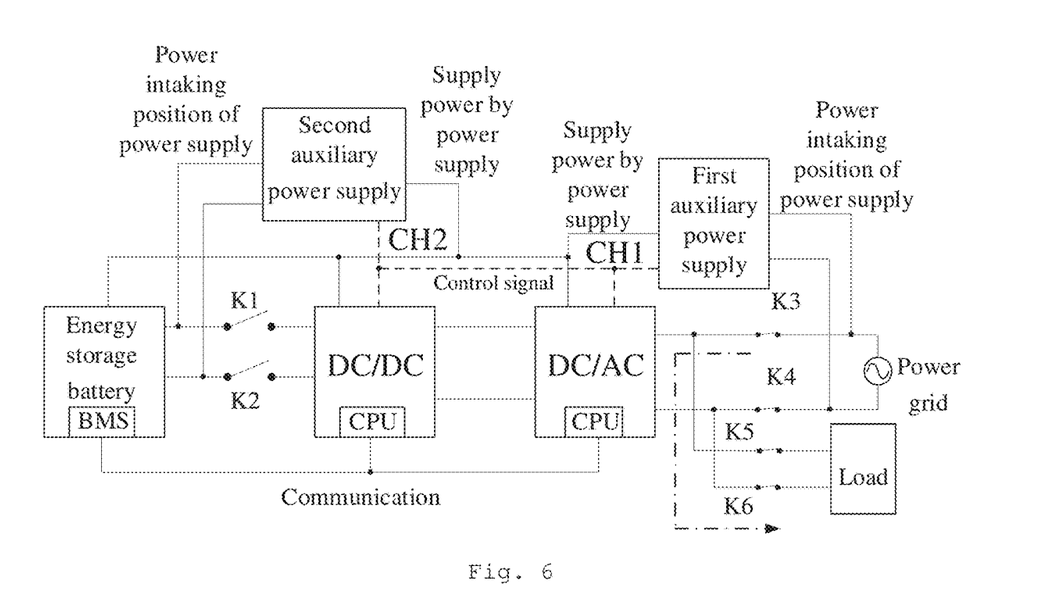
FIG. 6 is a schematic view showing an energy flow direction when an energy storage system provided by some embodiments of the present disclosure is in a first working mode.

When the energy storage system is in the first working mode, as shown in FIG. 6, the power grid is normal, the first auxiliary power supply starts to work and supplies power to the entire energy storage system, and the control signal CH2 controls the second auxiliary power supply not to work. At this time, the energy storage battery does not discharge, and energy flows from the power grid to the load.

Figure 7:
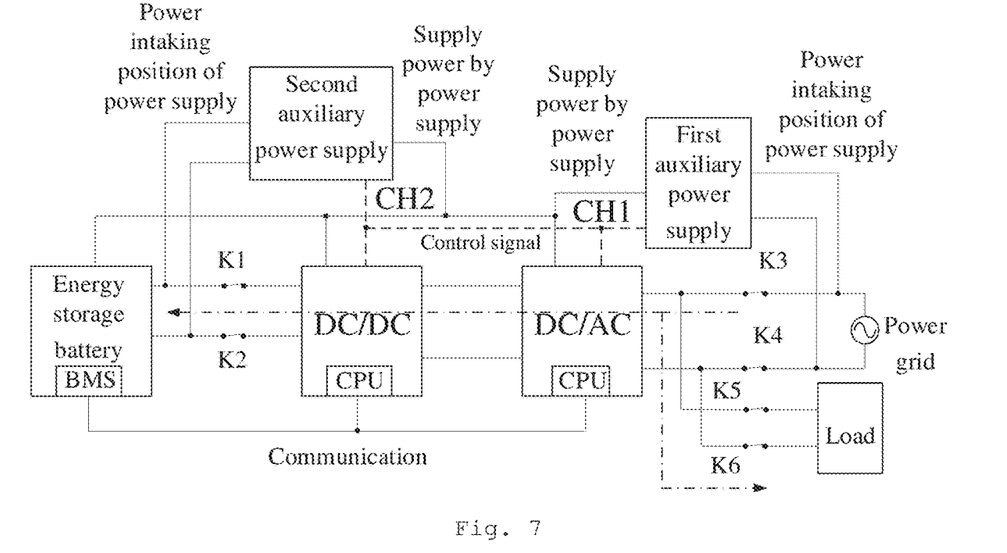
FIG. 7 is a schematic view showing an energy flow direction when an energy storage system provided by some embodiments of the present disclosure is in a second working mode.

When the energy storage system is in the second working mode, as shown in FIG. 7, the power grid is normal, the first auxiliary power supply starts to work and supplies power to the entire energy storage system, and the control signal CH2 controls the second auxiliary power supply not to work. At this time, the energy storage battery is in a charging state, and energy flows from the power grid to the load and the energy storage battery.

Figure 8:
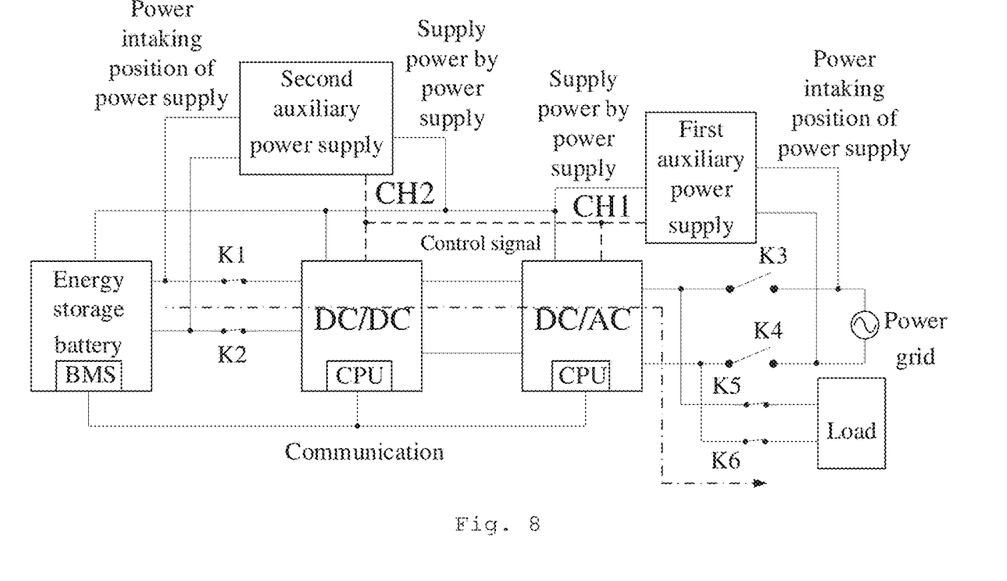
FIG. 8 is a schematic view showing an energy flow direction when an energy storage system provided by some embodiments of the present disclosure is in a third working mode.

When the energy storage system is in the third working mode, as shown in FIG. 8, the power grid is abnormal, the first auxiliary power supply does not work, the control signal CH2 controls the second auxiliary power supply to start working, and the second auxiliary power supply supplies power to the entire energy storage system, and the energy storage system is in an off-grid working state, and energy flows from the energy storage battery to the load.

When the energy storage system is in the fourth working mode, the power grid is abnormal, the electric quantity state of the energy storage battery does not satisfy the discharge condition, the first auxiliary power supply does not work, the control signal CH2 controls the second auxiliary power supply to start working, and the second auxiliary power supply supplies power to the entire energy storage system. At this time, the relays and the contactors are open, the second auxiliary power supply, the charge-discharge controller and the grid on-off controller operate in the low power consumption mode, which greatly reduces the discharge amount of the energy storage battery, prolongs the standby time of the energy storage battery waiting to be charged.

In the energy storage system provided by the embodiments of the present disclosure, working of the first auxiliary power supply or working of the second auxiliary power supply or the low power consumption mode is selected according to the working state of the energy storage system, so as to minimize the discharge amount of the energy storage battery when not in use, prolong its service time and avoid over-discharge, thereby reducing the after-sales maintenance cost and improving the client experience.

In some embodiments, the present disclosure provides an energy storage device, the energy storage device comprising the energy storage system provided in the above-described embodiment.

The energy storage device provided by the embodiments of the present disclosure, based on an architecture of the energy storage system consisting of an energy storage battery, a charge-discharge controller (bidirectional DC/DC), a grid on-off controller DC/AC and a load, selects a corresponding auxiliary power supply method according to different working modes of the system, so as to solve the problem of fast discharge or over-discharge of the energy storage battery.

It may be understood that, for the same or similar parts in the above-described embodiments, reference may be made to each other, and for the content not explained in detail in some embodiments, reference may be made to the same or similar content in other embodiments.

It is to be noted that, in the description of the present disclosure, the terms such as "first" and "second" which are only for illustrative purposes, shall not be understood as indicating or implying relative importance. In addition, in the description of the present disclosure, "a plurality of" means at least two unless specified otherwise.

Any process or method description in the flowchart or otherwise described here may be understood as representing a module, segment or part of a code that comprises one or more executable instructions for implementing specific logical functions or process steps, and the scope of embodiments of the present disclosure comprises additional implementations, wherein functions may be performed not according to the sequence shown or discussed, comprising a substantially simultaneous manner or a reversed sequence according to the functions involved, which should be understood by those skilled in the technical field to which the embodiments of the present disclosure belong.

It should be understood that various parts of the present disclosure may be implemented in hardware, software, firmware or a combination thereof. In the above-described embodiments, a plurality of steps or methods may be realized by software or firmware stored in a memory and performed by an appropriate instruction execution system. For example, if implemented in hardware, as in other embodiments, it may be implemented by any of the following technologies commonly known in this field or a combination thereof: a discrete logic circuit with a logic gate circuit for realizing a logic function on a data signal, an application specific integrated with circuit a suitable combinational logic gate circuit, a programmable gate array (PGA), a field programmable gate array (FPGA), or the like.

Those skilled in the art may understand that all or some of the steps carried by the method of the above-described embodiments may be accomplished by instructing related hardware by a program. The program may be stored in a computer-readable storage medium, and the program, when executed, comprises one of the steps of the method embodiments or a combination thereof.

In addition, various functional units in each embodiment of the present disclosure may be integrated in one processing module, or each unit may be physically present alone, or two or more units may be integrated in one module. The above-described integrated modules may be realized in the form of hardware, or realized in the form of functional modules of software. The integrated module may also be stored in a computer-readable storage medium if implemented in the form of functional modules of software and sold or used as an independent product.

The storage medium mentioned above may be a read-only memory, a magnetic disk or an optical disk, etc.

In the description of the specification, descriptions referring to the terms such as "one embodiment", "some embodiments", "an example", "a specific example" or "some examples" mean that specific features, structures, materials or characteristics described in conjunction with the embodiment or example are comprised in at least one embodiment or example of the present disclosure. In the specification, the schematic expressions of the above-described terms do not necessarily refer to the same embodiment or example. Moreover, the specific features, structures, materials or characteristics described may be combined in a suitable manner in any one or more embodiments or examples.

Although the embodiments of the present disclosure have been shown and described above, it may be understood that the above-described embodiments are exemplary and cannot be understood as limiting the present disclosure, and those skilled in the art may make changes, modifications, substitutions and variations to the above-described embodiments within the scope of the present disclosure.

What is claimed is:

1. A control method for an energy storage system, comprising:
    obtaining an operation parameter of a power grid and an electric quantity state of an energy storage battery in the energy storage system; and
    controlling working states of the power grid, the energy storate battery, a first auxiliary power supply and a second auxiliary power supply according to the operation parameter of the power grid and the electric quantity state of the energy storage battery;
    wherein the operation parameter of the power grid comprises: a current, a voltage and frequency information of the power grid; and
    the controlling of the working states of the power grid, the energy storage battery, the first auxiliary power supply and the second auxiliary power supply according to the operation parameter of the power grid and the electric quantity state of the energy storage battery comprises:
    determining whether the power grid operates normally according to the current, the voltage and the frequency information of the power grid; and
    when the power grid operates abnormally, controlling the power grid to be disconnected from the energy storage system, controlling the first auxiliary power supply not to work, and determining, according to the electric quantity state of the energy storage battery, whether an electric quantity of the energy storage battery is sufficient.

2. The method according to claim 1, further comprising:
    controlling the energy storage battery to be disconnected from the energy storage system when the electric quantity of the energy storage battery is sufficient; and
    controlling the energy storage battery to be connected to the energy storage system when the electric quantity of the energy storage battery is insufficient.

3. A control method for an energy storage system, comprising:
    obtaining an operation parameter of a power grid and an electric quantity state of an energy storage battery in the energy storage system; and
    controlling working states of the power grid, the energy storage battery, a first auxiliary power supply and a second auxiliary power supply according to the operation parameter of the power grid and the electric quantity state of the energy storage battery;
    wherein the operation parameter of the power grid comprises: a current, a voltage and frequency information of the power grid; and
    the controlling of the working states of the power grid, the energy storage battery, the first auxiliary power supply and the second auxiliary power supply according to the operation parameter of the power grid and the electric quantity state of the energy storage battery comprises:
    determining whether the power grid operates normally according to the current, the voltage and the frequency information of the power grid; and
    when the power grid operates abnormally, controlling the power grid to be disconnected from the energy storage system, controlling the first auxiliary power supply not to work, and determining, according to the electric quantity state of the energy storage battery, whether an electric quantity of the energy storage battery is sufficient.

4. The method according to claim 3, further comprising:
    when the electric quantity of the energy storage battery is sufficient, controlling the energy storage battery to be connected to the energy storage system, and controlling the second auxiliary power supply to work; and
    controlling the energy storage battery to be disconnected from the energy storage system when the electric quantity of the energy storage battery does not satisfy a discharge condition.

5. The method according to claim 4, further comprising:
    when the electric quantity of the energy storage battery does not satisfy the discharge condition, controlling a load to be disconnected from the energy storage system, and controlling the second auxiliary power supply, a charge-discharge controller and a grid on-off controller to operate in a low power consumption mode.

6. A control apparatus for an energy storage system, comprising:
    a data obtaining module configured to obtain an operation parameter of a power grid and an electric quantity state of an energy storage battery in the energy storage system; and
    a device control module configured to control working states of the power grid, the energy storage battery, a first auxiliary power supply and a second auxiliary power supply according to the operation parameter of the power grid and the electric quantity state of the energy storage battery;
    wherein the operation parameter of the power grid comprises: a current, a voltage and frequency information of the power grid; and
    the device control module is configured to determine whether the power grid operates normally according to the current, the voltage and the frequency information of the power grid, and when the power grid operates abnormally, control the power grid to be disconnected from the energy storage system, control the first auxiliary power supply not to work, and determine, according to the electric quantity state of the energy storage battery, whether an electric quantity of the energy storage battery is sufficient.

7. An energy storage system, comprising: an energy storage battery, a charge-discharge controller (DC/DC), a grid on-off controller (DC/AC), a power grid, a load, a first auxiliary power supply, a second auxiliary power supply and the control apparatus according to claim 6;
wherein the energy storage battery is connected to the charge-discharge controller (DC/DC) and the grid on-off controller (DC/AC) sequentially;
the grid on-off controller (DC/AC) is connected to the power grid and the load;
the first auxiliary power supply is connected to the power grid, the charge-discharge controller (DC/DC) and the grid on-off controller (DC/AC); and
the second auxiliary power supply is connected to the energy storage battery, the charge-discharge controller (DC/DC) and the grid on-off controller (DC/AC).

8. An energy storage device, comprising: the energy storage system according to claim 7.

9. A control method for an energy storage system, comprising:
obtaining an operation parameter of a power grid and an electric quantity state of an energy storage battery in the energy storage system; and
controlling working states of the power grid, the energy storage battery, a first auxiliary power supply and a second auxiliary power supply according to the operation parameter of the power grid and the electric quantity state of the energy storage battery;
wherein the operation parameter of the power grid comprises: a current, a voltage and frequency information of the power grid; and
the controlling of the working states of the power grid, the energy storage battery, the first auxiliary power supply and the second auxiliary power supply according to the operation parameter of the power grid and the electric quantity state of the energy storage battery comprises:
determining whether the power grid operates normally according to the current, the voltage and the frequency information of the power grid; and
when the power grid operates normally, controlling the power grid to be connected to the energy storage system, controlling the first auxiliary power supply to work, controlling the second auxiliary power supply not to work, and determining, according to the electric quantity state of the energy storage battery, whether an electric quantity of the energy storage battery is sufficient.

10. The method according to claim 9, further comprising:
controlling the energy storage battery to be disconnected from the energy storage system when the electric quantity of the energy storage battery is sufficient; and
controlling the energy storage battery to be connected to the energy storage system when the electric quantity of the energy storage battery is insufficient.

\* \* \* \* \*

UNITED STATES PATENT AND TRADEMARK OFFICE
CERTIFICATE OF CORRECTION

PATENT NO. : 12,341,343 B2
APPLICATION NO. : 18/567954
DATED : June 24, 2025
INVENTOR(S) : Ningning Chen et al.

Page 1 of 2

It is certified that error appears in the above-identified patent and that said Letters Patent is hereby corrected as shown below:

In the Claims

Column 9, Line 42, Claim 1, delete "storate" and insert -- storage --

Column 9, Lines 64-67, continued to Column 10, Lines 1-3, Claim 2, delete "The method according to claim 1, further comprising:
controlling the energy storage battery to be disconnected from the energy storage system when the electric quantity of the energy storage battery is sufficient; and controlling the energy storage battery to be connected to the energy storage system when the electric quantity of the energy storage battery is insufficient." and insert -- The method according to claim 1, wherein the controlling of the working states of the power grid, the energy storage battery, the first auxiliary power supply and the second auxiliary power supply according to the operation parameter of the power grid and the electric quantity state of the energy storage battery comprises: determining whether the power grid operates normally according to the current, the voltage and the frequency information of the power grid; and when the power grid operates normally, controlling the power grid to be connected to the energy storage system, controlling the first auxiliary power supply to work, controlling the second auxiliary power supply not to work, and determining, according to the electric quantity state of the energy storage battery, whether an electric quantity of the energy storage battery is sufficient. --

Column 10, Lines 4-31, Claim 3, delete "A control method for an energy storage system, comprising: obtaining an operation parameter of a power grid and an electric quantity state of an energy storage battery in the energy storage system; and controlling working states of the power grid, the energy storage battery, a first auxiliary power supply and a second auxiliary power supply according to the operation parameter of the power grid and the electric quantity state of the energy storage battery; wherein the operation parameter of the power grid comprises: a current, a voltage and frequency information of the power grid; and the controlling of the working states of the power grid, the energy storage battery, the first auxiliary power supply and the second auxiliary power supply according to the operation parameter of the power grid and the electric quantity state of the energy storage battery comprise: determining whether the power grid operates normally according to the current, the voltage and the frequency information of the power grid; and when the power grid operates abnormally, Signed and Sealed this
Second Day of September, 2025

Coke Morgan Stewart
*Acting Director of the United States Patent and Trademark Office* controlling the power grid to be disconnected from the energy storage system, controlling the first auxiliary power supply not to work, and determining, according to the electric quantity state of the energy storage battery, whether an electric quantity of the energy storage battery is sufficient." and insert -- The method according to claim 2, further comprising: controlling the energy storage battery to be disconnected from the energy storage system when the electric quantity of the energy storage battery is sufficient; and controlling the energy storage battery to be connected to the energy storage system when the electric quantity of the energy storage battery is insufficient. --

Column 10, Line 32, Claim 4, delete "The method according to claim 3, further comprising:" and insert -- The method according to claim 1, further comprising: --